United States Patent [19]
Baldino

[11] Patent Number: 5,407,562
[45] Date of Patent: Apr. 18, 1995

[54] WATER RECLAIMING APPARATUS

[76] Inventor: Daniel W. Baldino, 13530 Deming Ave., #1, Downey, Calif. 90242

[21] Appl. No.: 220,199

[22] Filed: Mar. 30, 1994

[51] Int. Cl.6 ............................................. B01D 36/02
[52] U.S. Cl. .................................. 210/86; 210/104; 210/257.1; 210/335; 210/416.3
[58] Field of Search ............. 210/86, 104, 109, 257.1, 210/258, 259, 335, 416.1, 416.3, 455

[56] References Cited

U.S. PATENT DOCUMENTS

| | | | |
|---|---|---|---|
| 1,985,435 | 12/1934 | Watson | 210/104 |
| 2,239,612 | 4/1941 | Lawlor | 210/257.1 |
| 3,222,268 | 12/1965 | Clauss et al. | 210/335 |
| 3,915,857 | 10/1975 | Olson | 210/104 |
| 4,112,972 | 9/1978 | Lajeuness | 137/597 |
| 4,134,833 | 1/1979 | McCormick | 210/121 |
| 4,812,237 | 3/1989 | Cawley et al. | 210/605 |
| 4,902,411 | 2/1990 | Lin | 210/257.1 |
| 5,004,536 | 4/1991 | Geisler | 210/136 |
| 5,059,330 | 10/1991 | Burkhardt | 210/44 |

Primary Examiner—Christopher Upton

[57] ABSTRACT

An apparatus to effect the reclaiming of waste water includes a storage tank in operative communication through filtration tanks, that in turn receives water from an enclosed preliminary filtration container. From the storage tank, a delivery pump provides for the coupling of water hoses to obtain water from the storage tank structure.

3 Claims, 4 Drawing Sheets 5,407,562

WATER RECLAIMING APPARATUS

BACKGROUND OF THE INVENTION

1. Field of the Invention

The field of invention relates to water reclaiming apparatus, and more particularly pertains to a new water reclaiming apparatus wherein the same is arranged to provide for plural stage filtration and subsequent storage of water.

2. Description of the Prior Art

Domestic waste water and its reclamation for potable drinking water has been directed in the prior art and exemplified by the U.S. Pat. No. 4,812,237, with further domestic waste water being utilized and indicated in U.S. Pat. Nos. 4,112,972; 5,059,330; and 5,004,536.

The instant invention attempts to overcome deficiencies of the prior art by providing for an economical and readily employed filtration facility permitting the reuse of domestic waste water after plural filtering stages, and this respect, the present invention substantially fulfills this need.

SUMMARY OF THE INVENTION

In view of the disadvantages inherent in the known types of water reclaiming apparatus now present in the prior art, the present invention provides a water reclaiming apparatus wherein the same is directed to direct domestic waste water through a plurality of filtration stations into a storage tank for subsequent reuse through a pumping station. As such, the general purpose of the present invention, which will be described subsequently in greater detail, is to provide a new water reclaiming apparatus and method which has many of the advantages of the prior art listed heretofore and many novel features that result in a water reclaiming apparatus which is not anticipated, rendered obvious, suggested, or even implied by any of the prior art, either alone or in any combination thereof.

To attain this, the present invention provides an apparatus to effect the reclaiming of waste water includes a storage tank in operative communication through filtration tanks, that in turn receives water from an enclosed preliminary filtration container. From the storage tank, a delivery pump provides for the coupling of water hoses to obtain water from the storage tank structure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water reclaiming apparatus and method which has many of the advantages of the prior art listed heretofore and many novel features that result in a water reclaiming apparatus which is not anticipated, rendered obvious, suggested, or even implied by any of the prior art, either alone or in any combination thereof.

It is another object of the present invention to provide a new water reclaiming apparatus which may be easily and efficiently manufactured and marketed.

It is a further object of the present invention to provide a new water reclaiming apparatus which is of a durable and reliable construction.

An even further object of the present invention is to provide a new water reclaiming apparatus which is susceptible of a low cost of manufacture with regard to both materials and labor, and which accordingly is then susceptible of low prices of sale to the consuming public, thereby making such water reclaiming apparatus economically available to the buying public.

Still yet another object of the present invention is to provide a new water reclaiming apparatus which provides in the apparatuses and methods of the prior art some of the advantages thereof, while simultaneously overcoming some of the disadvantages normally associated therewith.

An even further object of the present invention is to provide a new water reclaiming apparatus which includes a storage tank in operative communication through filtration tanks, that in turn receives water from an enclosed preliminary filtration container.

Still yet another object of the present invention is to provide a new water reclaiming apparatus which further includes a delivery pump for obtaining water from the storage tank structure through a series of coupled water hoses.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
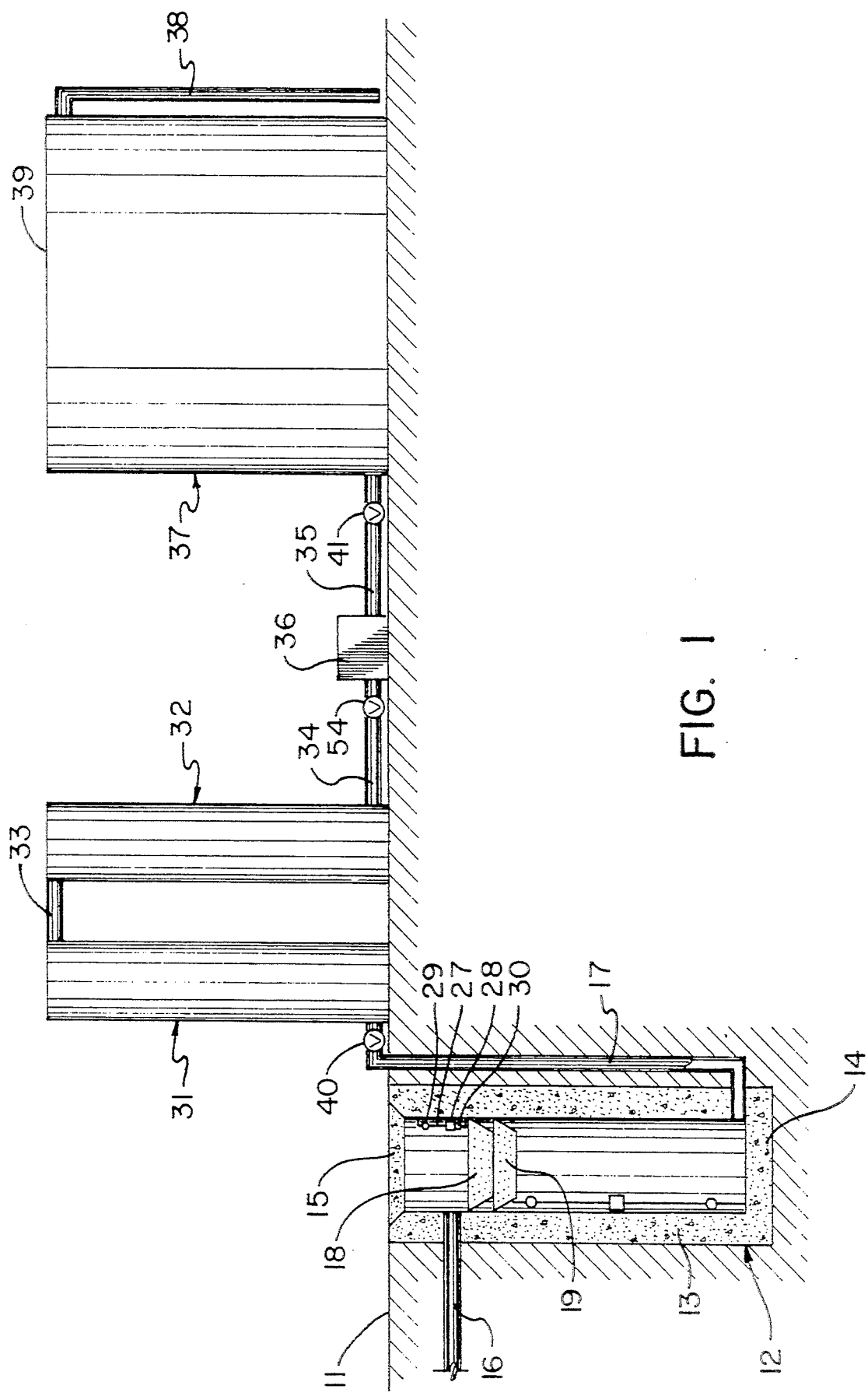
FIG. 1 is an orthographic view of the invention.

With reference now to the drawings, and in particular to FIGS. 1 to 5 thereof, a new water reclaiming apparatus embodying the principles and concepts of the present invention and generally designated by the reference numeral 10 will be described.

Figure 3:
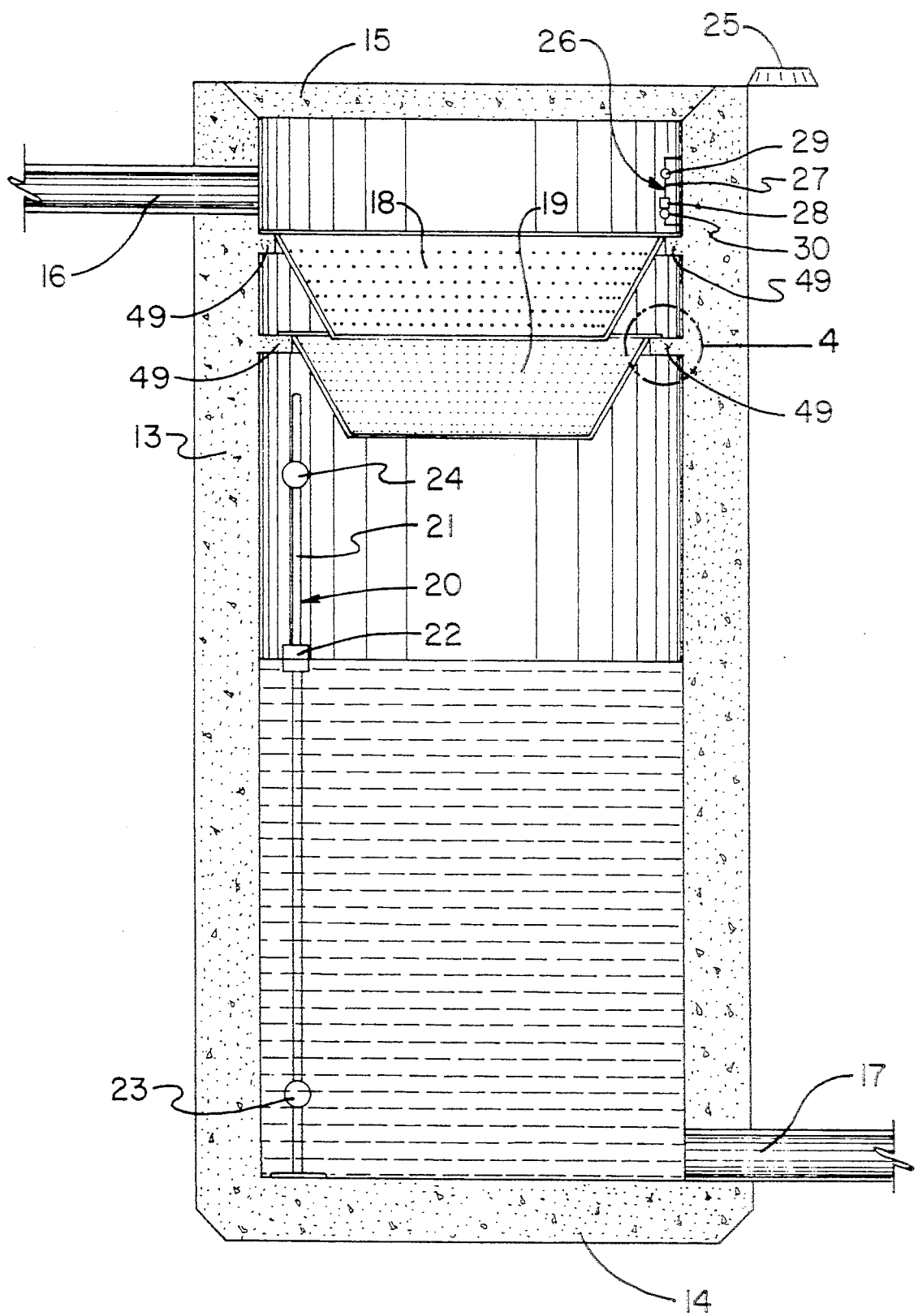
FIG. 3 is an enlarged orthographic view of the preliminary filtration container.
Figure 4:
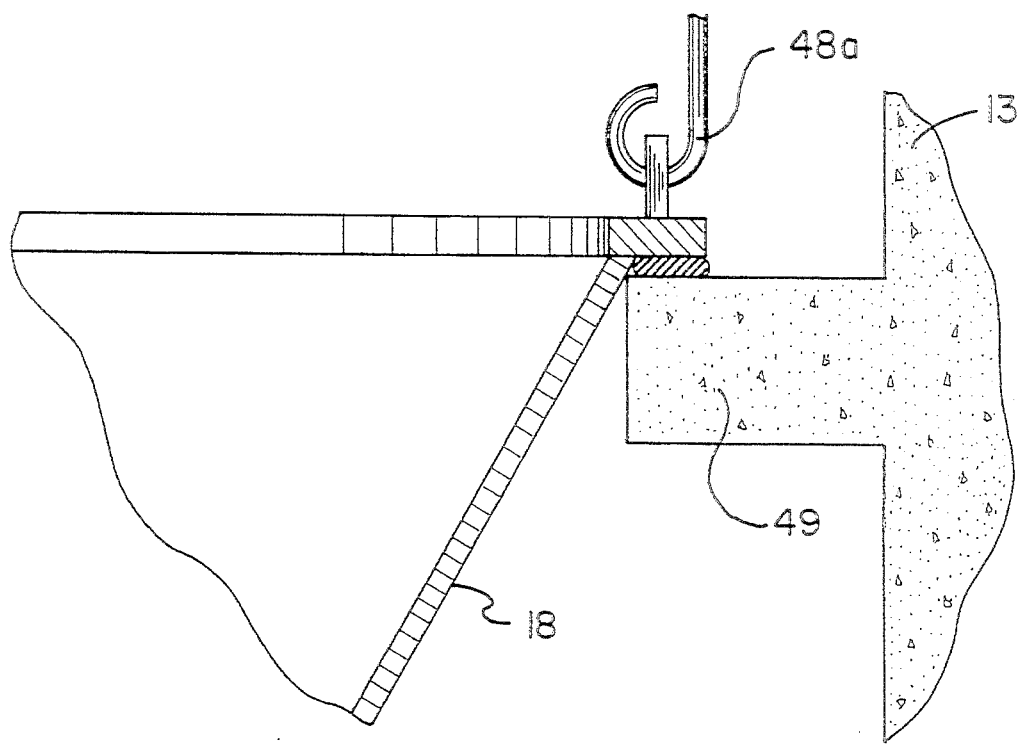
FIG. 4 is an orthographic partial view indicating a mounting of the preliminary filtration basket structure within the preliminary filtration container.
Figure 5:
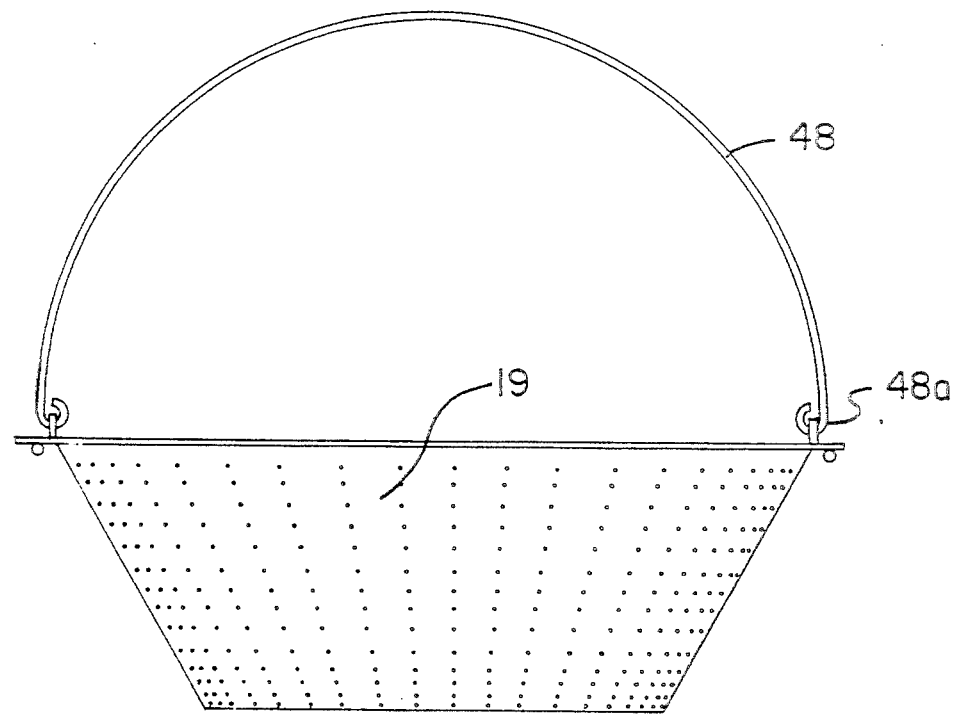
FIG. 5 is an orthographic view of the basket structure arranged for use by the preliminary filtration container.

More specifically, the water reclaiming apparatus 10 of the instant invention comprises a preliminary filtration container 12 which may be positioned within a ground surface 11, such as indicated in FIG. 1. The preliminary filtration container 12 is provided with a continuous side wall 13, a floor 14, and a top wall 15, with the top wall 15 being removably mounted relative to the container for access to first and second filtration basket members 18 and 19. The baskets 18 and 19 are of respective coarse and fine filtration characteristic and are each mounted onto a corresponding annular rim 49 relative to each of the filtration baskets, as best illustrated in FIG. 3. To this end, the second filtration basket 19 should be of a smaller diameter than the first basket 18 to permit its passage relative to the upper annular rim 49, with each basket having a basket handle 48 connected to the respective basket by a handle loop 48a for ease of manual manipulation of the basket structure, as shown for the second basket in FIG. 5.

Between the second filtration basket 19 and the floor 14 is a first float switch 20, wherein a first guide rod 21 fixedly mounted relative to the floor 14 and includes a first float member 22 slidably mounted along the first guide rod 21 dependent upon water surface within the container 12. A first switch first contact 23 is positioned between the float member 22 and the floor 14 on the first guide rod 21 and is arranged to contact the float member 22 to curtail operation of the primary fluid pump 36 during low water levels within the container 12. Further, when the first float member 22 contacts a first switch second contact 24 positioned between the float member 22 and the second basket 19, the pump 36 is actuated to direct fluid that is received within the container 12 from the first fluid conduit 16 to a second fluid conduit 17.

A second fluid switch 26 is positioned within the container 12 between the first basket 18 and the container top wall 15, with the second float switch 22 having a second rod 27 spaced from the wall 13 of the container 12 and extending from the first basket to the top wall. A second float 28 is slidably mounted along the second rod 27 and arranged for buoyancy relative to fluid within the container 12, such that should there be plugging of the filtration baskets or the second conduit, the second float 28 contacts a first contact 29 to effect audible actuation of an alarm 25 (see FIG. 2) with contact of the second switch second contact 30 disengaging the audible alarm 25 in a normal functioning of the second switch.

Figure 2:
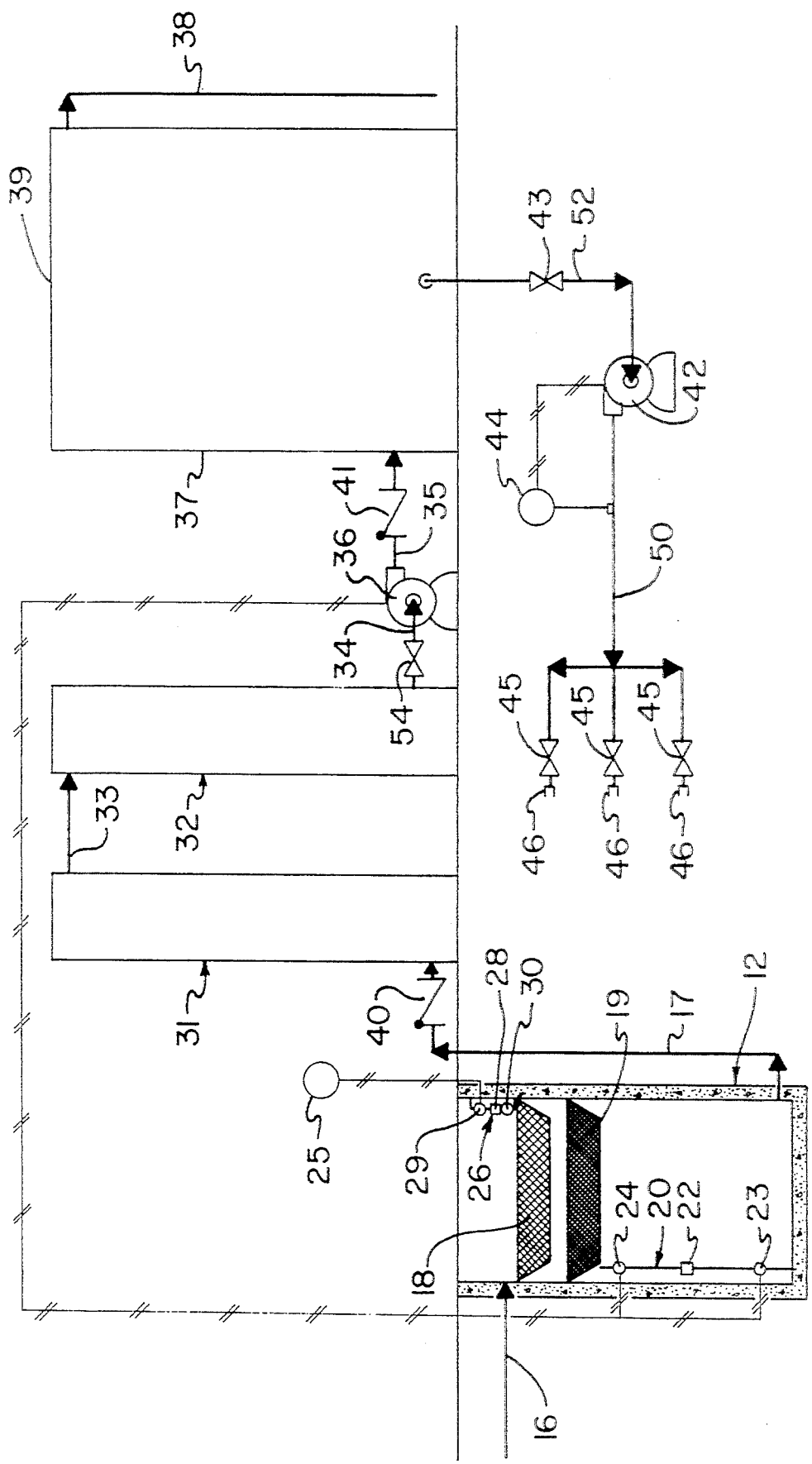
FIG. 2 is a diagrammatic illustration of the invention indicating association between the various components.

As illustrated in FIGS. 1 and 2, water pumped from the second fluid conduit 17 is directed to a first filtration tank 31 through a first check valve 40. Upon water being directed into the first filtration tank 31 by way of the primary fluid pump 36, a third conduit 33 extends from an uppermost end of the first filtration tank to the uppermost end of a second filtration tank 32. A fourth conduit 34 at a lowermost end of the second filtration tank directs fluid through a fourth conduit valve 54 to the primary pump 36, and subsequently to a fifth conduit 35 in fluid communication with the primary pump 36, with the fifth conduit 35 having a second check valve 41 to direct fluid into a storage tank 37 while preventing backflow of fluid from the second storage tank 37 to the second check valve 41. A sixth conduit 38, or overflow conduit, is directed from the storage tank 37 in adjacency to the storage tank top wall 39 to permit overflow excess water to be directed from the storage tank.

The filtration tanks 31 and 32 contain any filtering material conventionally known which may be utilized for cleaning, deodorizing, and sanitizing the fluid passing therethrough. Such filtering materials may take the form of any combination of the following: paper filters; charcoal filters; sand filters; diatomaceous earth filters, and other similar particulate or web based filtering components.

Reference to FIG. 2 indicates that a seventh conduit 52 is directed from the storage tank 37 by means of a second pump 42 in fluid communication with the seventh conduit through a seventh conduit valve 43, such that fluid is directed under pressure through the second pump 42 through an eighth conduit 50. A second pump switch 44 is oriented as a pressure sensitive switch, such that upon limited pressure within the eighth conduit 50, the second pump 42 is deactivated from an on activated position to an off position. The second pump 42 is operable to pressurize the eighth conduit 50 and direct fluid under pressure to a series of outlet valve members 45 each having an outlet coupling 46, whereupon an exterior hose, conduit, and the like may be directed to the individual one of the couplings 46 for subsequent use in gardening, washing, and the like in reuse of the water stored within the storage tank 37.

As to the manner of usage and operation of the present invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A water reclaiming apparatus comprising:
    a preliminary filtration container, the preliminary filtration container having a side wall, a floor, and a top wall removably mounted relative to the side wall;
    a first fluid conduit directed into the side wall in adjacency to the top wall;

a second fluid conduit in fluid communication with the preliminary filtration container directed through the side wail in adjacency to the floor;

a first filtration member of coarse mesh mounted within the preliminary filtration container in adjacency to the top wall;

a second filtration member of fine mesh mounted within the preliminary filtration container between the first filter member and the floor;

a first filtration tank in fluid communication with the second conduit;

a second conduit check valve mounted within the second conduit;

a second filtration tank;

a third conduit directed between the first filtration tank and the second filtration tank;

a fourth conduit directed from the second filtration tank;

a fourth conduit valve positioned in line with the fourth conduit;

a primary fluid pump in fluid communication with the fourth conduit;

a fifth conduit directed from the primary fluid pump;

a fifth conduit check valve in line with the fifth conduit;

a storage tank in fluid communication with the fifth conduit spaced from the fifth conduit check valve;

a first float switch mounted within the preliminary filtration container between the second filter web and the floor, with the first float switch having a first guide rod fixedly mounted within the preliminary filtration container, and a first float member slidably directed along the first guide rod, and a first switch first contact mounted onto the first guide rod in adjacency to the floor between the first float member and the floor, and a first switch second contact mounted onto the first guide rod between the first float member and the second filter basket, wherein the first switch first contact effects discontinuance of operation of the primary fluid pump, and the first switch second contact effects actuation of the primary fluid pump.

2. An apparatus as set forth in claim 1, and further including a second float switch mounted within the primary filtration tank between the first filter web and the top wall, with the second float switch having a second rod fixedly mounted within the primary filtration container, and a second float member slidably directed along the second rod, with a second switch first contact positioned in adjacency to the top wall, and a second switch second contact positioned between the second float member and the first filter web; and, an alarm being electrically connectable to a power source and further being in electrical communication with the second switch first contact to effect actuation of the audible alarm, with the second switch second contact arranged to effect deactivation of the alarm.

3. An apparatus as set forth in claim 2, wherein the storage tank includes a storage tank top wall; and further comprising a sixth conduit directed from the storage tank in adjacency to the top wall;

a seventh conduit in fluid communication with the storage tank;

a seventh conduit valve in line with the seventh conduit a second pump in communication with the seventh conduit;

an eighth conduit extending from the second pump to a plurality of outlet valve members, with each outlet valve member including a fluid coupling to permit fluid connection to one of said couplings.

* * * * *